United States Patent [19]
Hurley

[11] 4,027,184
[45] May 31, 1977

[54] PUMPED SINGLE-PASS RETURN LIQUID METAL COLLECTOR WITH REVERSED CURRENT PATH FOR ACYCLIC MACHINES

[75] Inventor: James D. Hurley, Saratoga Springs, N.Y.

[73] Assignee: General Electric Company, Schenectady, N.Y.

[22] Filed: Oct. 24, 1975

[21] Appl. No.: 625,532

[52] U.S. Cl. .................. 310/219; 310/178
[51] Int. Cl.² ........................ H02K 13/00
[58] Field of Search ............ 310/219, 178, 232, 11; 417/50; 322/48

[56] References Cited
UNITED STATES PATENTS

| | | | |
|---|---|---|---|
| 2,401,166 | 5/1946 | Kobel | 310/178 |
| 3,133,216 | 5/1964 | Sayers | 310/178 |
| 3,211,936 | 10/1965 | Harvey | 310/178 |
| 3,270,228 | 8/1966 | Rioux | 310/178 |
| 3,436,575 | 4/1969 | Harvey | 310/219 |
| 3,453,467 | 7/1969 | Harvey | 310/178 |
| 3,916,235 | 10/1975 | Massar | 310/178 |
| 3,989,968 | 11/1976 | Hatch | 310/11 |

*Primary Examiner*—R. Skudy
*Attorney, Agent, or Firm*—Marvin Snyder; Joseph T. Cohen; Jerome C. Squillaro

[57] ABSTRACT

To assure availability of liquid metal for operation of liquid metal electrical current collectors in an acyclic machine at all operating speeds of the machine, liquid metal expelled electromagnetically from the region between an individual rotor collector ring and an individual stator collector ring is returned to the region from which it was expelled by causing the expulsion-producing armature current to flow in reverse through the expelled liquid metal, thereby pumping the liquid metal electromagnetically back into the region from which it was expelled.

12 Claims, 12 Drawing Figures

PUMPED SINGLE-PASS RETURN LIQUID METAL COLLECTOR WITH REVERSED CURRENT PATH FOR ACYCLIC MACHINES

Introduction

This invention relates to acyclic machines employing liquid metal electrical collectors, and more particularly to a method and apparatus for permitting such machines to operate, unflooded with liquid metal, under all attainable conditions of speed.

In any closed conductive loop carrying an electrical current, the magnetic field produced by the current interacts with the current, creating a force on each portion or element of the conductor. This force always acts in an outward direction so as to tend to enlarge the area bounded by the closed loop.

In an acyclic machine using, instead of solid brushes, liquid metal collectors on a collector ring, the liquid metal forms a portion of the current-carrying loop. Hence the same force is generated in the liquid metal as in the solid electrical conductor portions of the machine. While the solid conductors (e.g., copper) may be mechanically supported through solid electrical insulation, rotation of the collector rings prevents such positive containment of the liquid metal employed in place of brushes.

In generator applications, the liquid metal may be introduced into the collector gap after a suitable minimum speed has been attained by the rotor and removed whenever rotor rotational speed decreases below such minimum speed. Thus centrifugal force generated within the liquid as it is caused to rotate by the rotating collector ring has, in generator applications, been successfully employed to retain the liquid metal in the collector site above this minimum speed. This is shown, for example, in L. M. Harvey, U.S. Pat. Nos. 3,211,936, issued Oct. 12, 1965, and 3,546,506, issued Dec. 8, 1970, both of which are assigned to the instant assignee.

In motor applications, such as for ship propulsion, capability of applying full torque (and overload torques) at any and all rotor speeds in both directions of rotation, including zero speed and emergency reversals, is essential. At zero and low rotor speeds, centrifugal force is either completely unavailable or insufficient to retain the liquid metal in the collector site. Without some other force to retain the liquid metal at the collector site, or return it to the collector site, the liquid metal will be expelled from the collector site and either the electric circuit will be broken or electrical arc-over will occur. In either case, the motor will then be inoperative. In disc-type acyclic machines only, a single armature circuit loop is involved. In drum-type acyclic machines, wherever multiple drums are used a number of armature current loops are involved. Thus more ampere turns exist in the multiple drum-type machines, and the liquid metal expulsion forces are correspondingly multiplied. In either case it is apparent that liquid metal must be retained at the collector site if an operative motor is to be constructed.

In B. D. Hatch application Ser. No. 625,168, filed Oct. 23, 1975 and assigned to the instant assignee, liquid metal expelled electromagnetically from the collector site is electromagnetically pumped back to the collector site by causing the liquid metal to flow, a second time, across the undeviated armature current path. This requires a tortuous liquid metal path. As an alternative to the teachings to the Hatch application, the present invention is concerned with making the liquid metal path more direct and requiring the armature current to follow a circuitous path in order to achieve an objective similar to that of the aforementioned Hatch application.

Accordingly, one object of the invention is to provide a continuously-available liquid metal current collector for an acyclic machine in which the liquid metal flow follows a relatively nontortuous path.

Another object is to provide a method of counteracting Lorentz expulsion forces on liquid metal in the current collector of an acyclic machine by reversing armature current flow therethrough.

Another object is to provide a liquid metal current collector for an acyclic motor in which armature current flow is made to follow a circuitous path to prevent electromagnetic expulsion of liquid metal in the current collector.

Another object is to provide a liquid metal current collector for an acyclic machine which is relatively easy to manufacture and yet provides a homogeneous armature current path and low resistance, single pass, liquid metal circulation loop.

Briefly, in accordance with a preferred embodiment of the invention, an acyclic machine includes a stator collector ring having an axially-oriented, radially-inner member, and a rotor collector ring rotatable within the stator collector ring. An intermediate collector electrode having a portion situated between the rotor and stator collector rings includes an axially-oriented electrode member located radially outward of the axially-oriented, radially-inner member of the stator collector ring. The intermediate electrode contacts insulation over its entire area except for a strip on the radially-innermost circumferential surface thereof in alignment with the radially-outermost circumferential surface of the rotor collector ring and except for the radially-inner circumferential surface of the axially-oriented electrode member. A liquid metal situated between the rotor collector ring and the stator collector ring substantially fills all passageways between the rotor collector ring and the intermediate electrode and between the stator collector ring and the intermediate electrode so as to provide an electrical current path between the rotor collector ring and the portion of the intermediate collector electrode situated between the rotor and stator collector rings and between the axially-oriented electrode member and the axially-oriented, radially-inner member of the stator collector ring.

In accordance with another preferred embodiment of the invention, a method of counteracting Lorentz forces on liquid metal in the current collector of an acyclic machine comprises passing electrical current in one radial direction from a rotor collector ring of the machine through the liquid metal to an intermediate electrode so as to create an expulsion force acting in a first direction on the liquid metal. The liquid metal expelled in the first direction from between the rotor collector ring and the intermediate electrode is channeled to a region between the stator collector ring and the intermediate electrode. Electrical current is passed in the opposite radial direction from the intermediate electrode to the stator collector ring so as to create a magnetohydrodynamic force on the liquid metal pumping the metal in a second direction opposite to the first direction toward the region between the rotor collector ring and the intermediate electrode, so that liquid metal expelled from between the rotor collector ring and the intermediate electrode is replenished.

Brief Description of the Drawings

The features of the invention believed to be novel set forth with particularity in the appended claims. The invention itself, however, both as to organization and method of operation, together with further objects and advantages thereof, may best be understood by reference to the following description taken in conjunction with the accompanying drawings in which:

Description of Typical Embodiments

Figure 1:
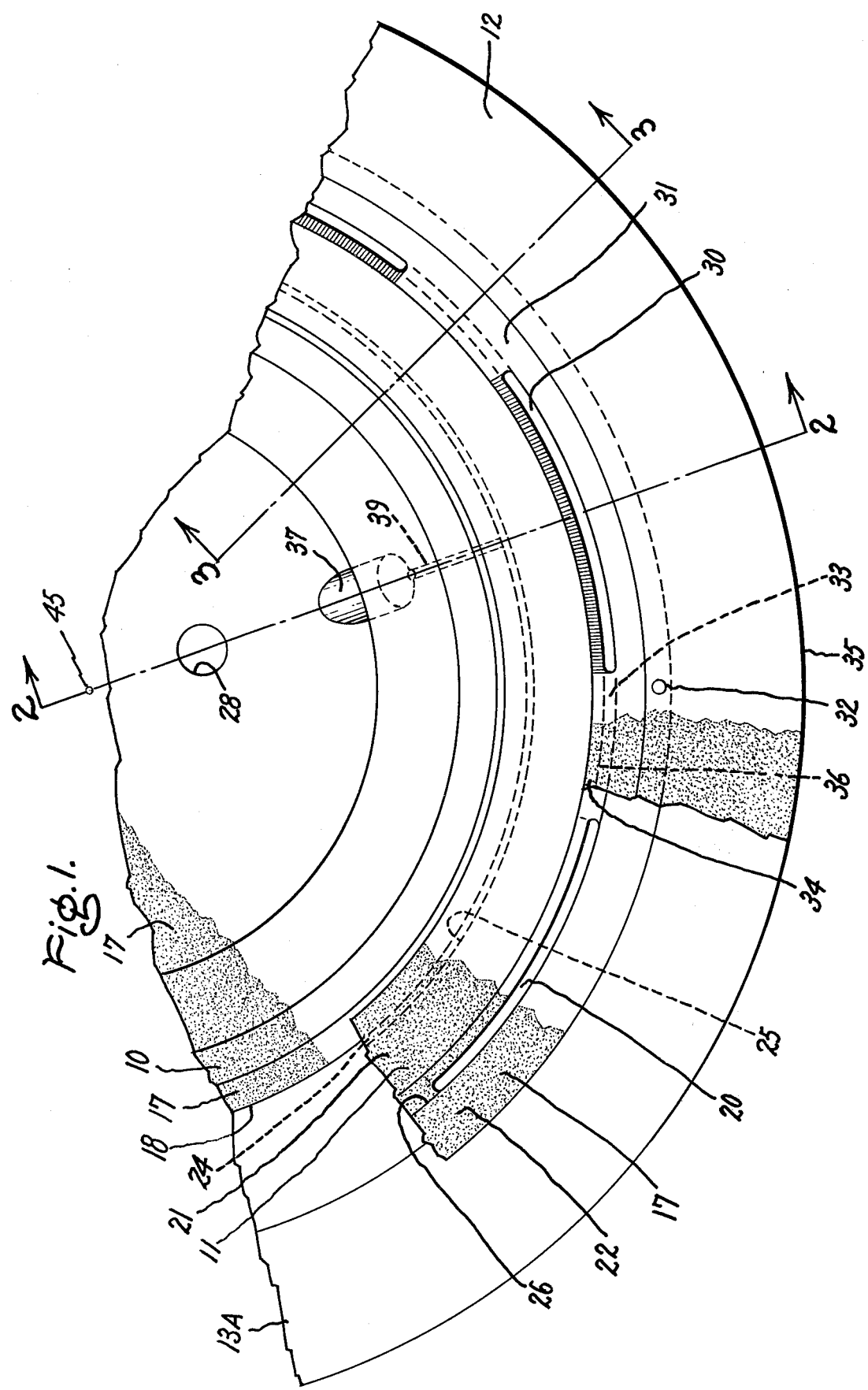
FIG. 1 is a partially cut away, axial end view of a peripheral portion of the entire current collector assembly.

In FIG. 1, a peripheral segment of a rotor collector ring 10 of an acyclic machine, such as a motor is illustrated as being encircled about its circumference by an intermediate electrode 11, shown broken away, which is encircled about its circumference by a stator collector ring 12, also shown broken away. The motor rotates about an axis of rotation 45. The rotor collector ring, except for the radially-outermost surface 18 thereof, is completely coated with insulation 17. This insulation typically comprises a ceramic coating, such as sprayed alumina, which is subsequently vacuum-impregnated with an epoxy insulation. A first plurality of openings, such as opening 37, are formed in the rotor collector ring in an annular pattern to allow flow of liquid metal from one side of the rotor collector ring to the other. Similarly, a second plurality of openings, such as opening 28, are formed in the rotor collector ring in an annular pattern radially-inward of openings 37 to permit gaseous communication between one side of the rotor collector ring and the other.

Intermediate electrode 11 contains a plurality of circumferentially-oriented slots 20 in an annular wall 23 at one side of electrode 11 which integrally joins radially inner and outer portions 21 and 22, respectively, thereof. A passageway 24 is formed between radially-outermost surface 18 of rotor 10 and the complementary inner surface 25 of radially-inner portion 21 of electrode 11. Except for surface 25 and radially-inner surface 26 of radially-outer portion 22 of electrode 11, the entire electrode is coated with, or in contact with, insulation 17. A plurality of radial passageways, such as passageway 39, interconnect each of openings 37 with passageway 24 through radially-outermost surface 18 of the rotor collector ring.

Stator collector ring 12 contains a plurality of circumferential slots 30 in an annular wall 31. These slots are the same size as, and preferably both axially and radially aligned with, slots 20 in intermediate electrode 11. A passageway 33 is formed between radially-innermost integral member 34 of stator collector ring 12 and radially-inner surface 26 of intermediate electrode 11. Stator collector ring 12 is coated with insulation 17 over its entire surface, except for its radially-outermost surface 35 to which external electrical connections may be made and except for radially-outer surface 36 of its radially-innermost member 34. Because of the presence of insulation on the outermost circumference of intermediate electrode outer portion 22, insulation on inner circumferential surface 19 of stator collector ring 12 abutting intermediate electrode outer portion 22 may be omitted if desired. A stationary, electrically insulating disk 13A is situated against the far isde of stator collector ring 12.

Keying means 32 are employed to retain intermediate electrode 11 stationary with respect to stator collector ring 12. A ceramic or other type of insulating key material is utilized in the keying means in order to avoid short-circuiting the intermediate electrode to the stator collector ring.

Figure 2:
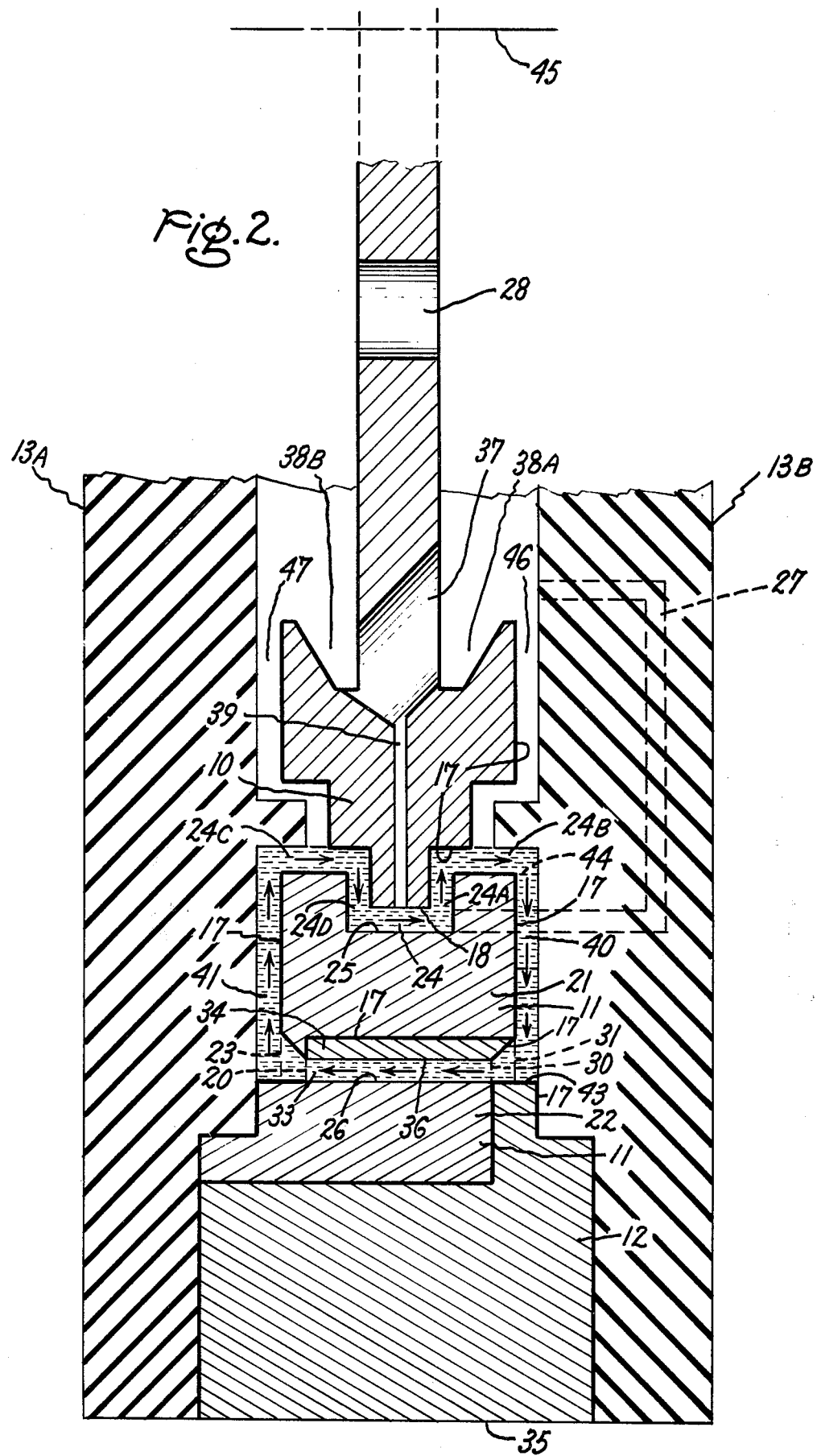
FIG. 2 is a cross sectional view of the apparatus of FIG. 1, taken in an axial plane along line 2—2 thereof.

In FIG. 2, which represents a cross section of a region of the liquid metal electrical current collector of the instant invention, taken at the radial location of line 2—2 shown in FIG. 1, the flow of liquid metal through the current collector region is illustrated by arrows as moving axially in one direction through passageway 24 between uninsulated surface 18 of rotor collector ring 10 and inner surface 25 of radially-inner portion 21 of electrode 11, then radially inward through passageway 24A between walls of insulation 17 on the surface of rotor collector ring 10 and radially-inner portion 21 of electrode 11, then axially in the same direction through passageway 24B to the axial end of electrode 11. Here the liquid metal turns radially outward through a passageway 40 between insulation 17 on radially-inner portion 21 of intermediate collector electrode 11 and a stationary, electrically-insulating disk 13B situated against the side of stator collector ring 12.

Chambers 38A and 38B are joined by liquid metal passageway 37 connected to circumferential passageway 24 through radial passageway 39. A plurality of radial passageways in disk 13B, such as passageway 27, connect passageway 24 to chamber 38A, while several axial holes through the radially-inner portion of rotor collector ring 10, such as hole 28, provide gaseous communication between the spaces in rotor collector ring 10 radially inward of chambers 38A and 38B. Any pressure applied to the liquid metal in passageway 24 in a manner described, infra, is thus transmitted to liquid metal in passageway 27, causing the liquid metal therein, together with ingested gas, to flow radially-inward to a location radially-inward of chamber 38A, where it is discharged into the chamber and settles into chamber 38B as well as chamber 38A through passageway 37. Centrifugal force due to rotation of rotor collector ring 10 in chambers 38A and 38B separates the ingested gas from the liquid metal, so that liquid metal with essentially no gas returns to passageway 24 through passageway 39.

Rotation of rotor collector ring 10 imparts a tangential velocity to liquid metal adjacent the rotor surfaces, with maximum velocity applied at the radially outermost surface 18. This tangential velocity creates a high pressure in the liquid metal in passageway 24, which is exerted on liquid metal in passageway 27, thus causing the aforementioned discharge of liquid metal containing ingested gas into chamber 38A. In order to minimize diminution of the centrifugally-induced high pressure due to turbulence created between the moving sides of rotor collector ring 10 and the stationary sides of portion 21 of electrode 11, passageway 27 communicates directly with passageway 24. This necessitates blocking off of passageway 40 in each region where it is crossed by a passageway 27, such as with an apertured insert 44, ensuring separation of flows in each of these passageways. A more detailed description of liquid-gas phase separation apparatus such as this, and its function, is contained in B. D. Hatch application Ser. No. 625,130 filed Oct. 23, 1975 and assigned to the instant assignee.

Upon reaching insulation 17 on the radially-innermost surface of stator collector ring shoulder 43, the liquid metal turns to flow in an axial direction through circumferential slots 30 in wall 31 of stator collector ring 12 opposite to the axial flow direction in passageway 24, and thence continues axially through passageway 33 between radially-innermost stator collector ring member 34 and radially-inner surface 26 of radially-outer intermediate electrode portion 22. The liquid metal thereupon emerges through circumferential slots 20 in wall 23 of intermediate electrode 11 and reaches the axial end of intermediate electrode 11. Here the liquid metal turns to flow radially-inward through a passageway 41 between insulation 17 on radially-inner portion 21 of intermediate electrode 11 and stationary, electrically-insulating disk 13A abutting the side of stator 12. Disks 13A and 13B may typically be comprised of an epoxy fiberglass.

Upon reaching the radially-innermost end of passageway 41, the liquid metal flow turns and is conducted between insulation 17 on rotor collector ring 10 and on radially-inner portion 21 of intermediate electrode 11 first in an axial direction through a passageway 24C and thence in a radially-outward direction through a passageway 24D, to passageway 24. Any overflow of liquid metal from chambers 38A and 38B returns to passageways 24D and 24C through passageways 46 and 47, respectively.

Figure 3:
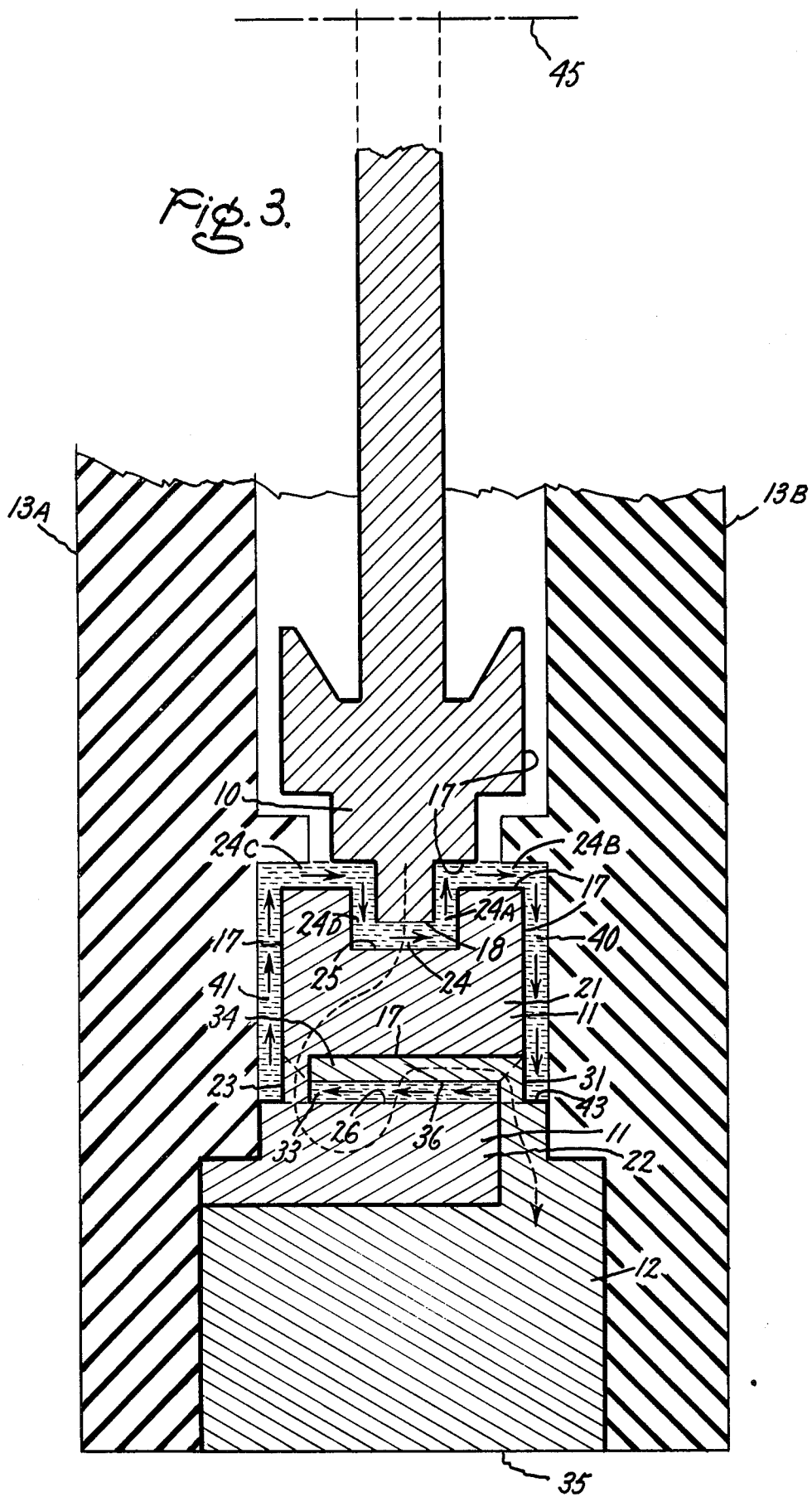
FIG. 3 is a cross sectional view of the apparatus of FIG. 1, taken in an axial plane along line 3—3 thereof.

In FIG. 3, which represents a cross section of a region of the liquid metal current collector of the instant invention, taken at the radial location of line 3—3 shown in FIG. 1, another aspect of the liquid metal flow through the current collector region is illustrated by multiple arrows. Thus liquid metal moves axially in one direction through passageway 24 between surface 18 of rotor collector ring 10 and inner surface 25 of radially-inner portion 21 of electrode 11, then radially inward through passageway 24A between walls of insulation 17 on the surface of rotor collector ring 10 and radially-inner portion 21 of electrode 11, then axially in the same direction through passageway 24B to the axial end of electrode 11 where the liquid metal turns radially outward through passageway 40 between stationary, electrically-insulating disk 13B and insulation 17 on radially-inner portion 21 of intermediate collector electrode 11.

Upon reaching insulation 17 on the radially-innermost surface of collector ring shoulder 43, the liquid metal is prevented from turning to flow axially at this location through passageway 33, as it does at section 2—2 in FIG. 1, due to absence of a slot in stator wall 31 at this location. Moreover, presence of wall 23 in intermediate collector electrode 11 at the opposite axial end of passageway 33 also precludes direct axial flow of liquid metal through passagway 33 at this location. Hence axial flow of liquid metal in passageway 33 between walls 31 and 23 occurs only by virtue of circumferential movement of the liquid metal which brings it between aligned stator slots 30 and intermediate collector electrode slots 20. Thus liquid metal moving radially-outwardly through passageway 40 at the radial current collector apparatus location illustrated in FIG. 3 must move circumferentially upon reaching stator collector ring shoulder 43 in order to pass axially through passageway 33 and arrive at passageway 41 for radially inward flow. Upon reaching the radially-innermost end of passageway 41, the liquid metal is conducted first in an axial direction through passageway 24C and thence in a radially-outward direction through passageway 24D to passageway 24.

Assuming conventional armature current flows from rotor collector ring 10 to stator collector ring 12, current flows from surface 18 of rotor collector ring 10, through the liquid metal in passageway 24 to radially-inner portion 21 of intermediate collector electrode 11. As best evident from FIG. 3, an armature current path, as indicated by a dotted arrow, is provided through wall 23 of intermediate collector electrode 11 to radially-outermost portion 22 thereof. Presence of insulation 17 on radially-innermost member 34 of stator collector ring 12, and on the abutting surface of radially-innermost intermediate collector electrode portion 21 if desired, precludes passage of armature current directly from intermediate collector electrode portion 21 to liquid metal in passageway 33. However, armature current is conducted from radially-outermost intermediate collector electrode portion 22 to radially-innermost stator collector ring member 34 which axially overlap each other through the liquid metal in passageway 33, as shown by the dotted arrow. Therefore Lorentz forces exerted on the liquid metal in each of passageways 24 and 33 due to the direction of electrical current flow therethrough act in the direction of the arrows in each of the respective passageways. Consequently, liquid metal continuously traverses a closed loop in flowing about radially-innermost collector electrode portion 21 and radially-innermost stator collector ring member 34. Hence the liquid metal expelled from passageway 24 due to armature current flow across the passageway is continuously replenished by liquid metal pumped thereto by armature current flow across passageway 33.

By properly controlling liquid metal passageway sizes in the expulsion and return portions of the liquid metal circulation loop, flow resistance therein can be regulated, allowing the liquid metal flow to be substantially balanced so that essentially no differential liquid metal height occurs on the sides of the rotor collector ring. The criteron for balancing these flows is:

$$\frac{P_e}{P_r} = \frac{R_e}{R_r}$$

where $P_e$ is the liquid metal expulsion pressure in passageway 24, $P_r$ is the liquid metal return pumping pressure in passageway 33, $R_e$ is the liquid metal flow resistance in the expulsion path (which extends from the axial mid-point of passageway 24C through passageways 24D, 24 and 24A to the axial mid-point of passageway 24B) and $R_r$ is the liquid metal flow resistance in the return path (which extends from the axial mid-point of passageway 24B through passageways 40, 33 and 41 to the axial mid-point of passageway 24C).

The current collector configuration of the invention minimizes the volume of liquid metal required to conduct armature current, necessitating only a small volume of liquid metal in the recirculation design. Since the liquid metal inventory in the current collector apparatus is small, liquid metal recirculation can be provided around the complete periphery of the rotor collector ring, allowing for recirculation in both dynamic and static modes of operation (i.e., either full peripheral filling or partial peripheral filling of liquid metal, as described in greater detail in B. D. Hatch application, Ser. No. 625,138 filed Oct. 23, 1975 and assigned to the instant assignee).

Minimization of liquid metal volume is achieved in the present invention as a result of the single-pass liquid metal flow feature. That is, by minimizing the number of bends in the liquid metal expulsion and return paths, the depth of the annular ring liquid metal required to fill these bends is minimized.

In the present invention, the magnetohydrodynamic expulsion force is equal to BId where B is the magnetic flux density, I is the armature current, and $d$ is the radial width of passageway 24. Hence expulsion pressure in passageway 24 is $$\frac{BId}{Sd}$$

where $S$ is the mean circumferential arc length of liquid metal in passageways 24 and 33 through which armature current passes. Therefore expulsion pressure is inversely proportional to the liquid arc length in passageway 24 conducting armature current, or $$P_e \alpha \frac{1}{S}.$$

Resistance to liquid metal flow in the expulsion path is proportional to $1/S^2$ or $$R_e \alpha \frac{1}{S^2}.$$

In addition, since the axial liquid flow path is relatively nontortuous, the flow path in passageway 33 can be assumed to extend around the entire periphery of mean arc length S of liquid metal through which armature current passes, and therefore $$P_r \alpha \frac{1}{S} \text{ and }$$

$$R_r \alpha \frac{1}{S^2}.$$

Accordingly, $$\frac{P_e}{P_r} = \frac{R_e}{R_r} \sim 1$$

and the pumped pressure ratios equals the flow resistance ratios, so that the liquid metal flows are balanced.

It is apparent that the bending of the armature current in following a circuitous path between the rotor and stator collector rings, as shown in FIG. 3, produces Lorentz forces on the liquid metal in the correct directions to ensure recirculation of the metal. By requiring the armature current path to double back so as to re-cross the full stream of liquid metal and thereby produce recirculation pumping in the correct direction, both liquid metal volumes and pressures are minimized relative to the volumes and pressures extant when doubling back the liquid metal flow instead.

The foregoing describes a continuously-available liquid metal current collector for an acyclic machine in which the liquid metal flows through a relatively nontortuous path. In an acyclic motor employing the invention, armature current flow through the liquid metal current collector is made to follow a circuitous path to prevent electromagnetic expulsion of liquid metal in the current collector. The current collector for the acyclic machine is relatively easy to manufacture and yet provides a homogeneous electrical current path and low resistance, single pass, liquid metal circulation loop.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:
1. An acyclic machine comprising:
   a stator collector ring including a radially-outer member and an axially-oriented, radially-inner member;
   a rotor collector ring rotatable within said stator collector ring;
   an intermediate collector electrode including a portion situated between said rotor collector ring and said stator collector ring radially-inner member, said portion abutting said stator collector ring radially-inner member, said intermediate collector electrode further including an axially-oriented electrode member located radially outward of said axially-oriented, radially-inner member of said stator collector ring and abutting said stator collector ring radially-outer member; said intermediate electrode contacting insulation over its entire area except for a strip on the radially-innermost circumferential surface thereof in alignment with the radially-outermost circumferential surface of said rotor collector ring and except for the radially-inner circumferential surface of said axially-oriented electrode member; and
   a liquid metal situated between said rotor collector ring and said stator collector ring and substantially filling all passageways between said rotor collector ring and said intermediate electrode so as to provide an electrical current path between said rotor collector ring and the portion of said intermediate electrode situated between said rotor collector ring and said stator collector ring radially-inner member, and between said axially-oriented electrode member and said axially-oriented, radially-inner member of said stator collector ring.
2. The apparatus of claim 1 including means retaining said intermediate collector electrode and said stator collector ring in a common rotational condition with respect to said rotor collector ring.
3. The apparatus of claim 1 wherein said stator collector ring radially outer member is integral with said axially-oriented, radially-inner member thereof and said portion of said intermediate collector electrode and said axially-oriented electrode member are integral.
4. The apparatus of claim 1 wherein said liquid metal contacts said radially-outermost circumferential surface of said rotor collector ring and said strip on the radially-innermost circumferential surface of said intermediate collector electrode so as to form a continuous current path therebetween, and contacts the radially-outward circumferential surface of the radially-inner member of said stator collector ring and said radially- inner circumferential surface of said axially-oriented electrode member so as to form a continuous current path therebetween.

5. A current collector for an acyclic machine comprising: a rotor collector ring; a stator collector ring encircling said rotor collector ring; and an intermediate collector electrode situated between said rotor collector ring and said stator collector ring, a portion of each of said intermediate collector electrode and said stator collector ring axially overlapping each other such that the overlapping portion of said intermediate collector electrode abuts the non-overlapping portion of said stator collector ring and the overlapping portion of said stator collector ring abuts the non-overlapping portion of said intermediate collector electrode, said electrode including liquid metal flow path-defining means permitting liquid metal to flow in one axial direction between said rotor collector ring and said electrode and to flow in the opposite axial direction between the overlapping portions of said stator collector ring and said electrode, whereby electrical current flow between said rotor collector ring and said stator collector ring is substantially continuous over the entire circumference of said electrode in contact with liquid metal and flows in opposite radial directions through said liquid metal flowing in opposite axial directions, respectively.

6. The apparatus of claim 5 wherein said intermediate electrode contacts insulation over its entire area except for a continuous strip on the radially-innermost circumferential surface thereof in axial alignment with the radially-outermost circumferential surface of said rotor collector ring and except for the radially-inner circumferential surface of said portion of said intermediate electrode axially overlapping said portion of said stator collector ring.

7. A current collector for an acyclic machine comprising:
a stator collector ring including a radially-inner member, said inner member being joined to the main body thereof by an annular wall;
a rotor collector ring rotatable within said stator collector ring;
an intermediate collector electrode situated between said rotor collector ring and said stator collector ring and including a portion extending radially outward beyond said radially inner member of said stator collector ring, said radially-outward portion being joined to the main body of said electrode by an annular wall; and a liquid metal situated between said intermediate collector electrode and said rotor collector ring and between said radially-outward portion of said intermediate collector electrode and said radially inner member of said stator collector ring so as to provide a continuous current path extending from said rotor collector ring through said intermediate collector electrode to said stator collector ring.

8. The apparatus of claim 7 including means retaining said intermediate collector electrode and said stator collector ring in a common rotational condition with respect to said rotor collector ring.

9. The apparatus of claim 8 wherein each of said stator collector ring and said intermediate electrode contains aligned openings in its respective annular walls located radially inward of said portion of said electrode, said openings permitting liquid metal to continually circulate about the region of said electrode located radially inward of said portion thereof.

10. The apparatus of claim 7 wherein said portion of said electrode is aligned with said radially inner member of said stator collector ring.

11. The method of counteracting Lorentz forces on liquid metal in the current collector of an acyclic machine comprising:
passing electrical current in one radial direction from a rotor collector ring of said machine through said liquid metal to an intermediate electrode so as to create an expulsion force acting in a first direction on said liquid metal;
channeling liquid metal expelled in said first direction from between said rotor collector ring and said intermediate electrode to a region between a stator collector ring and said intermediate electrode; and
passing electrical current in the opposite radial direction from said intermediate electrode to said stator collector ring so as to create a magnetohydrodynamic force on said liquid metal pumping said metal in a second direction opposite to said first direction toward the region between said rotor collector ring and said intermediate electrode, whereby liquid metal expelled from between said rotor collector ring and said intermediate electrode is replenished.

12. The method of claim 11 wherein the electrical current passed through said liquid metal between the rotor collector ring and the intermediate electrode is the same electrical current passed from the intermediate electrode to said stator collector ring.

* * * * *